Nov. 9, 1937. W. E. ROUSE Re. 20,551

MOORING AND HOISTING APPARATUS

Original Filed April 29, 1932 3 Sheets-Sheet 1

INVENTOR
WARREN E. ROUSE
BY
Mac Kelenbach
ATTORNEYS

MOORING AND HOISTING APPARATUS

Original Filed April 29, 1932 3 Sheets-Sheet 2

INVENTOR
WARREN E. ROUSE
BY
Fika & Hickenbotham
ATTORNEYS

Nov. 9, 1937. W. E. ROUSE Re. 20,551
MOORING AND HOISTING APPARATUS
Original Filed April 29, 1932 3 Sheets-Sheet 3
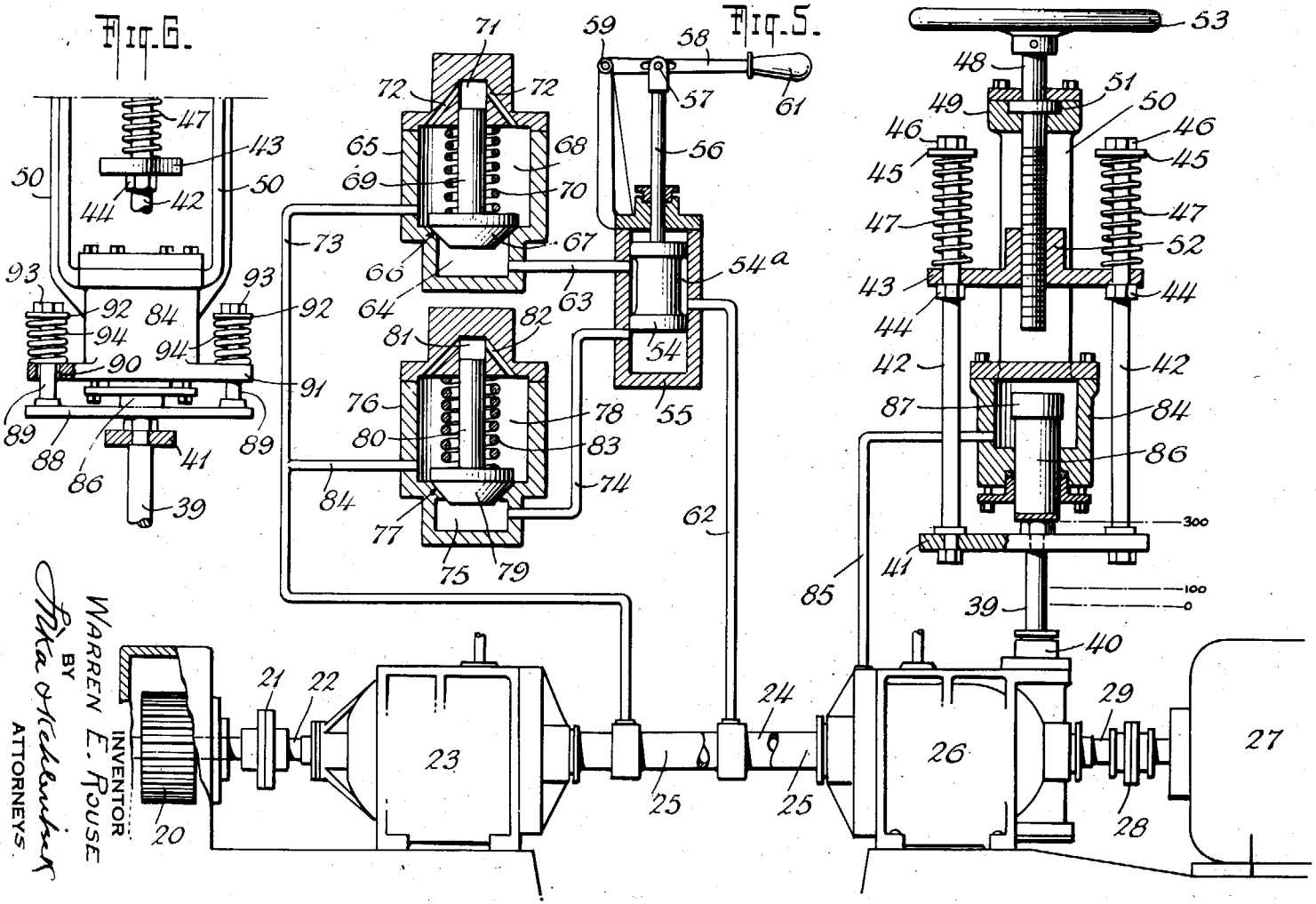
INVENTOR
WARREN E. ROUSE
BY
Fika & Kehlenbeck
ATTORNEYS Reissued Nov. 9, 1937

Re. 20,551

UNITED STATES PATENT OFFICE 20,551

MOORING AND HOISTING APPARATUS

Warren E. Rouse, Pleasant Ridge, Mich., assignor to The Waterbury Tool Company, Waterbury, Conn., a corporation of Connecticut Original No. 1,902,972, dated March 28, 1933, Serial No. 608,181, April 29, 1932. Application for reissue March 17, 1936, Serial No. 69,391

25 Claims. (Cl. 9—22)

My invention relates to mooring and hoisting apparatus, and more particularly to apparatus for mooring and hoisting floating objects subject to wave action, as represented, for instance, by devices designed for mooring airplanes or seaplanes to a vessel and for hoisting the same from the sea or other body of water to said vessel. Under such conditions the plane rises and falls with the wave action of the water and for the same reason the vessel is caused to roll, these factors varying in degree in accordance with the roughness of the body of water. Heretofore ships, boats, airplanes, seaplanes and other floating objects have been moored to vessels or equivalent mooring stations, and hoisted from the water by means of winches, ropes and booms in which no provision was made for eliminating jerks and other shocks due to alternate slackening and tightening of the mooring or hoisting rope which generally resulted in some type of more or less serious damage. It has been attempted to overcome these objections by providing devices in which the mooring rope is maintained under tension, and which includes manually controlled means for causing the device to perform the hoisting operations; these existing devices are such that the manually controlled means must be operated at exactly the right moment in order to avoid damage during the shift-over from the mooring to the hoisting functions.

My invention has for its object to provide an apparatus in which all of the previously existing objections are overcome and whereby the plane or other object may be safely moored in place and efficiently hoisted from the sea or other body of water at will. Other more specific objects will appear from the description hereinafter and the features of novelty will be pointed out in the claims.

Figure 1:
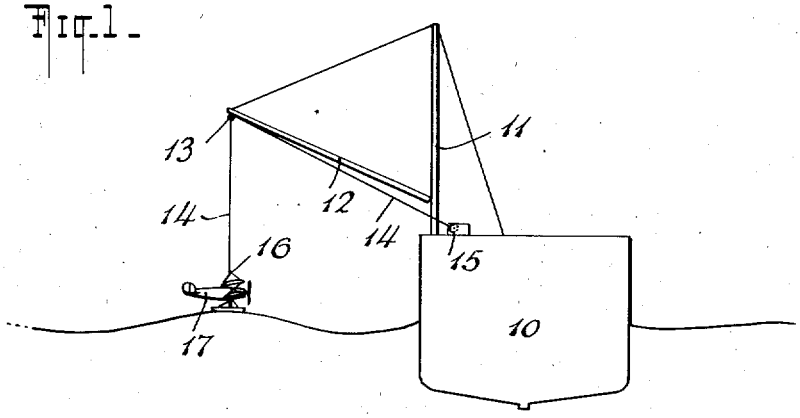
Figure 2:
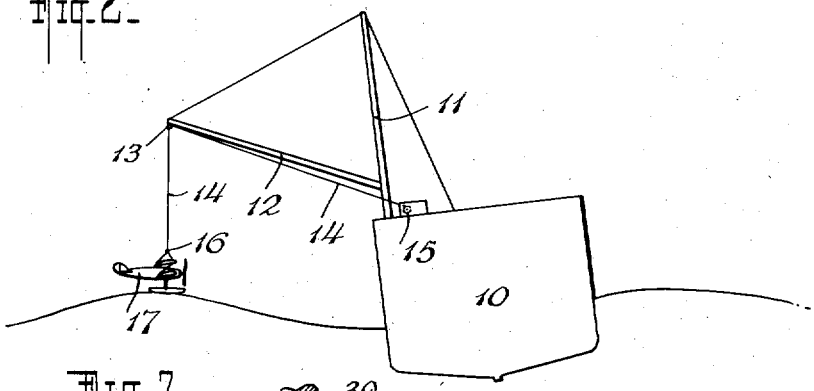
Figure 7:
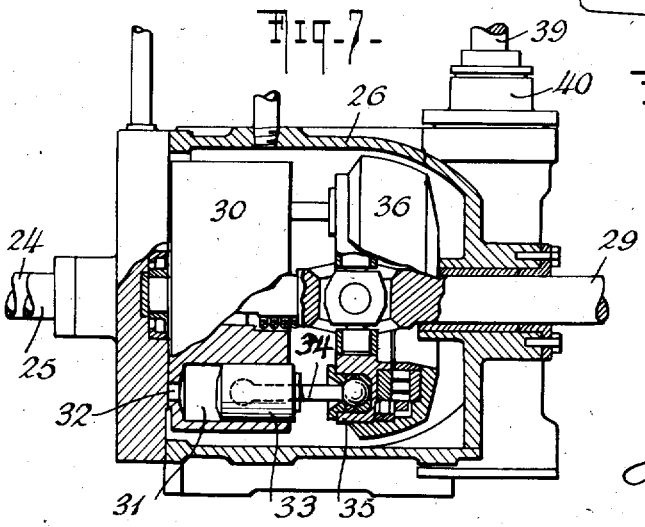
Figure 8:
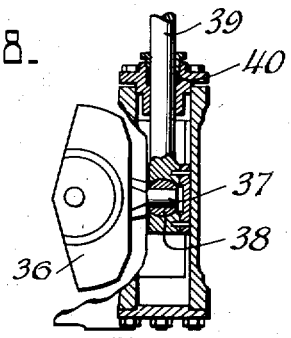
Figure 3:
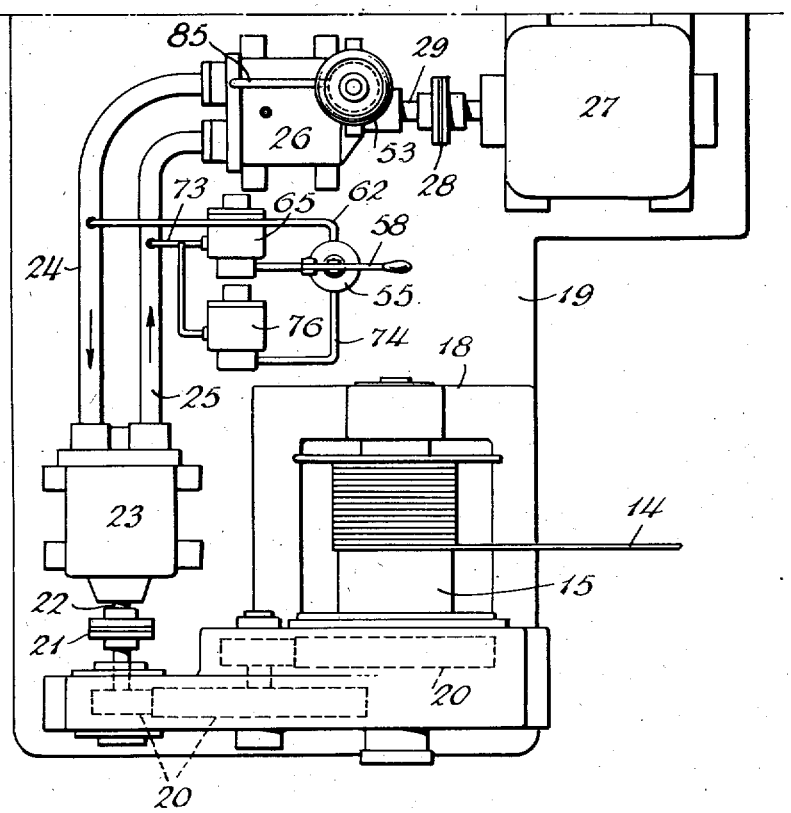
Figure 4:
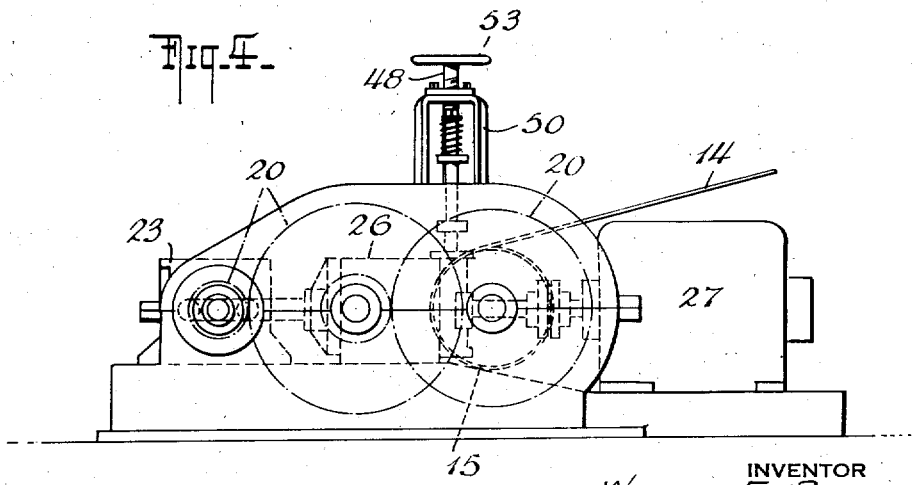

In the accompanying drawings, which illustrate an example of the invention and its utility without defining its limits, Figs. 1 and 2 are diagrammatic views showing a vessel rolling in a body of water, and an airplane moored alongside of said vessel; Fig. 3 is a plan view of the winch and associated elements of the apparatus; Fig. 4 is an end elevation thereof; Fig. 5 is a diagrammatic view, partly in section, of the control mechanism; Fig. 6 is a fragmentary view of a portion of said mechanism; Fig. 7 is a sectional elevation of variable speed and reversible pump included in the apparatus, and Fig. 8 is a fragmentary view of the pump shown in Fig. 7.

For the purpose of illustrating and describing the invention it has been shown in an installation designed primarily for mooring floating airplanes or their equivalent alongside of vessels, and for lifting said airplanes or their equivalent from the sea or other body of water aboard said vessel; it is to be understood that this is intended only as an example of the utility of the apparatus, and not as defining the limits of its field of service.

Referring more particularly to Figs. 1 and 2 of the drawings, 10 is a support illustrated in the form of a vessel floating in a rolling sea on which is mounted a mast 11 and a boom 12 adapted to be swung outboard over the water and inboard relatively to the vessel 10. At its free end the boom 12 is provided with a pulley 13 or equivalent device for the accommodation of a rope or cable 14 adapted to be wound upon and unwound from the drum 15 of a winch forming part of the apparatus and suitably secured upon the support or vessel 10; the free end of the rope or cable 14 is provided with an attaching device 16 adapted to be detachably fastened to a suitable part of the airplane 17 or equivalent object.

In Figs. 1 and 2 the airplane 17 floats upon the sea or other body of water substantially beneath the free end of the boom 12 and is moored to the vessel 10 by means of the rope or cable 14. As the ship 10 rolls in the sea and as the airplane 17 rises and falls by the action of the waves, the boom 12 and the airplane 17 will approach and move away from each other as will be apparent. Under such conditions the boom 12 may swing downwardly and thereby produce slack in the form of a loop in the rope or cable 14, and immediately thereafter may swing upwardly due to the rolling of the vessel and cause said rope or cable 14 to suddenly become taut. Unless provision is made to prevent the same, this sudden tightening of the cable 14 will violently jerk the airplane 17 and thereby cause damage thereto or to the cable 14 or to the apparatus on the vessel or to all of these elements. In order to overcome these serious objections my apparatus includes an improved elastic mechanism operatively connected with the drum 15, which mechanism during a given mooring period automatically reels in the rope or cable 14 when subject to undertension, and pays out said rope or cable when subject to overtension; the aforesaid mechanism also includes means, preferably manually controlled, for causing the airplane or equivalent floating object to be hoisted from the water at will in the manner to be more clearly set forth hereinafter.

As shown in Figs. 3 and 4, the drum 15 journalled in a suitable support 18 carried by a base 19, is connected by means of gearing 20 and a flexible coupling 21 with the shaft 22 of a hydraulic motor 23; the latter is provided with ports connected by means of pipes 24 and 25 with corresponding ports of a variable speed, reversible hydraulic pump 26. Any suitable means may be provided for operating the pump 26, the illustrated example showing a substantially constant speed electric motor 27 for this purpose; the motor 27 is connected, by means of a flexible coupling 28, with the drive shaft 29 of said pump 26.

The hydraulic device comprising the variable speed reversible fluid pressure pump 26, and the hydraulic or fluid pressure motor 23 operated thereby may be of any suitable conventional form, said pump and motor, as illustrated, being of the well known Waterbury type in which the pump is commonly referred to as the A-end, and the motor as the B-end. In the illustrated form of hydraulic device the motor 23 and the pump 26 are of similar construction in that each comprises a rotating barrel 30 provided with a plurality of cylinders 31 having openings 32 arranged to communicate in operative sequence with the previously mentioned ports of the pump and motor respectively and accordingly with the pipes 24 and 25. In the pump 26, as shown in Fig. 7, the barrel 30 is carried by the drive shaft 29, while in the motor 23 the corresponding barrel is carried by the shaft 22. The cylinders 31 are provided with reciprocable pistons 33 connected by means of piston rods 34 with swash plates 35 carried by the respective shafts 29 and 22, whereby all of the pistons are reciprocated in the respective cylinders when the mechanism is in operation. The swash plates 35 are rotatably mounted in tilting boxes 36 in any convenient manner as shown for instance in Fig. 7; in the motor or B-end 23 the tilting box 36 is generally held at a fixed inclination to the shaft 22, while in the pump or A-end 26 the tilting box 36 is capable of being adjusted to different angular positions relatively to the drive shaft 29. In order to effect the aforesaid adjustments, the tilting box 36, in the illustrated example, is provided with a stub shaft 37 which projects into a rocking bearing 38 seated in the lower end of a control member 39 slidably mounted for vertical movement in a stuffing box 40 of the pump 26 as shown in Fig. 8. From the above it will be evident that the amount of liquid pumped will depend upon the angular position of the tilting box 36 and swash plate 35 of the pump 26 with respect to the drive shaft 29. In the neutral position illustrated in Fig. 7, the tilting box 36 and swash plate 35 extend perpendicularly to the shaft 29 and no liquid is pumped; when the tilting box and swash plate are tilted in one direction from the neutral position, liquid is pumped in a given direction, and when tilted in the opposite direction the liquid is likewise pumped in the opposite direction.

The operation of the control member 39 to control the direction and quantity of fluid flow to and from the pump 26, and as a result the direction and speed of rotation of the motor 23 comprises the following mechanism: To enable the aforesaid adjustments to be manually effected at will, the control member 39 carries a cross-bar 41 upon which upwardly extending rods 42 are rigidly mounted in any convenient manner; the rods 42 project through and are vertically slidable, under certain conditions, in openings formed in a member 43. Normally the latter engages shoulders on projections 44 on the rods 42, the upper ends of which carry abutments in the form of washers 45 fixed in place by means of nuts 46. Expansion springs 47 surround the rods 42 and rest upon the member 43 with their upper ends in engagement with the aforesaid washers 45 or their equivalent as shown in Fig. 5; the springs 47 are of sufficient strength to operate the control member 39 as will be more fully brought out hereinafter. A control screw 48 is rotatably mounted in a bearing 49 mounted in place by means of a fixed yoke 50, suitable means, such as an annular shoulder 51, being provided to prevent lengthwise movement of said control-screw 48 relatively to the bearing 49 without interference with the rotation of said control-screw 48; the latter is in threaded engagement with an internally threaded boss 52 forming part of or carried by the member 43 and at its upper end is provided with a handwheel 53 or equivalent means for facilitating the manipulation of said control-screw 48.

For the purpose of effecting automatic maintenance of a substantially constant tension on the cable while the plane is riding on the water, a distributing valve 54 is slidably mounted in a stationary valve casing 55 and is carried by a rod 56 connected by a pin and slot pivot 57 with an operating lever 58; the latter is pivoted at 59 upon a bracket 60 fixed upon the casing 55 and is provided at its free end with an operating handle 61. As shown in Fig. 5 the valve 54 includes an intermediate portion of reduced diameter, whereby an annular space 54[a] is provided interiorly of the casing 55 between the opposite end portions of said valve 54 which are in fluid tight engagement with the inner surface of said valve casing 55.

From an intermediate point of the valve casing 55, a pipe 62 leads to the pipe 24 so as to establish communication between the latter and the interior of said casing 55. A second pipe 63 communicates with the interior of the casing 55 near one end thereof and leads to the interior of a lower chamber 64 forming part of a low pressure valve casing 65 as shown in Fig. 5; at its inner end the chamber 64 is provided with a valve seat 66 for co-operation with a low pressure valve 67 whereby communication between said lower chamber 64 and an upper chamber 68 of said valve casing 65 is controlled. The low pressure valve 67 is carried by a stem 69 and is maintained on and returned to the seat 66 by means of a pressure spring 70; the latter is relatively weak and is designed to permit the valve 67 to move away from the seat 66 when a predetermined low pressure is developed in the chamber 64. In the illustrated arrangement the stem 69 extends into and is slidable in a bore 71 formed in the cover of the casing 65, channels 72 connecting said bore 71 with the upper chamber 68 to prevent the formation of a fluid cushion or a vacuum in said bore 71. As shown in Fig. 5 a pipe 73 leads from the upper chamber 68 of the low pressure valve casing 65 to the pipe 25 and serves to connect the latter with said chamber 68 for the purpose to be more fully set forth hereinafter.

A third pipe 74 communicates with the interior of the valve casing 55 near the opposite end thereof and connects the same with the interior of a lower chamber 75 forming part of a high pressure valve casing 76 as shown in Fig. 5. A valve seat 77 is located between the lower chamber 75 and an upper chamber 78 of the valve casing 76 for co-operation with a high pressure valve 79 whereby communication between the chambers 75 and 78 is controlled; in the illustrated example the high pressure valve 78 is carried by a stem 80 which projects into and is slidable in a bore 81 formed in the cover of the valve casing 76. To prevent the formation of a fluid cushion or a vacuum in the bore 81 relief channels 82 lead therefrom to the chamber 78 as illustrated in Fig. 5. The high pressure valve 79 is maintained on and returned to the seat 77 by means of a pressure spring 83, the tension of which is such as to permit said valve 79 to be moved away from the seat 77 only by a predetermined relatively high pressure in the chamber 75. A pipe 84 leads from the chamber 78 of the high pressure valve casing 76, for instance, to the pipe 73 and thus establishes communication between the pipe 25 and the chamber 78 for the purpose to be more definitely set forth hereinafter; obviously the connection between the chamber 78 and the pipe 25 may be effected independently of the pipe 73 if necessary or desirable.

In addition to the parts so far described the apparatus includes a stationary cylinder 84 located above and in substantially axial registry with the control member 39, said cylinder 84 being supported in place in any convenient manner; as shown in Fig. 5 the cylinder 84 constitutes a support for the yoke 50. The interior of the cylinder 84 is connected by means of a high pressure pipe 85 with the hydraulic pump 26 for the purpose to be more fully pointed out hereinafter. A plunger 86 is slidably mounted in the cylinder 84 and projects outwardly beyond the same through a conventional stuffing box, the inner end of said plunger 86 being formed with a head 87 whereby the movement of the plunger out of the cylinder 84 is arrested at a predetermined point. At its outer end the plunger 86 carries a cross member 88 from which rods 89 extend in an upward direction, through openings 90 formed in arms 91; the latter project outwardly in opposite directions from the cylinder 84 and as shown may constitute integral parts thereof. The bottom of the cross member 88 is adapted to abut against, but is not fastened to the control member 39. Washers 92 or their equivalent are located at the free ends of the rods 89 and are fixed in place by means of nuts 93 to provide abutments for springs 94 which surround the rods 89 and also engage the arms 91 as illustrated in Fig. 6; the springs 94 constitute a spring return for the plunger 86 and are set for a predetermined lift as for instance 500 pounds. For bringing about the desired operative results the outward travel of the plunger 86 is limited, for instance by means of the head 87, to operate the control member 39 in a manner to adjust the pump 26 for developing a minimum speed of travel in the rope or cable 14 in a lifting direction, such as for instance 100 feet per minute.

In describing the operation of the apparatus it will be assumed that the airplane 17 is floating on a body of water in which the waves alternately raise and lower said plane at a speed of approximately 300 feet per minute; in such a sea the vessel 10 develops a roll which causes the outboard end of the boom 12 to correspondingly move up and down. To safely moor the airplane 17 to the ship 10 under such conditions, the fastening device 16 is attached to the plane and the distributing valve 54 is adjusted, by means of the lever 58, to the position shown in Fig. 5, it being understood that the electric motor 27 is in operation or otherwise is started at the proper time to operate the pump 26; the latter in turn operates the hydraulic motor 23 which, by means of the gearing 20, actuates the drum 15. At the same time the handwheel 53 is actuated in a manner to raise the member 43 and to thereby cause the spring 47 to move the control member 39 upwardly; the upward movement of the latter is such as to adjust the pump 26 to a pumping capacity which will develop a full speed raising, assumed in the instant case to be 300 feet per minute.

With the apparatus set in the manner set forth, the pipe 62, valve 54, pipe 63, low pressure valve 67, and pipe 73, constitute a by-pass in communication with the high pressure line, with the result that oil or its equivalent is by-passed through said low-pressure or relief valve 67. As said valve is designed to develop a merely nominal tension, such as for instance 500 pounds, on the line or cable 14, the latter is maintained in a taut condition in the following manner, as the airplane 17 rises and falls by the action of the waves.

As the hydraulic pump, at any given setting, has a constant delivery capacity, the volume of fluid which passes from the pump 26 and returns thereto likewise remains constant for such setting. Thus when, during a mooring period, the plane 17 is lifted by the action of a wave, a portion of said fluid will pass through the pipe 24 directly to the hydraulic motor 23 and after operating the same will return to the pump 26 through the pipe 25. The remaining portion of said fluid will be by-passed through the pipe 62 to the annular space 54a of the distributing valve 54 and from thence through the pipe 63 to the chamber 64 of the low pressure valve casing 65. The pressure of this fluid in said chamber 64 will be sufficient to lift the low pressure valve 67 from its seat 66 so that said remaining portion of fluid will be free to pass to and through the pipe 73 to the pipe 25 and accordingly will flow therethrough back to the pump 26; in other words the restricted amount of fluid which passes through the motor 23 is replenished with the balance of the fluid which is by-passed through the low pressure valve casing 65 so that full amount of fluid constituting the capacity of the hydraulic pump at said given setting is returned thereto. Obviously that portion of the fluid which is by-passed has no effect to operate the motor 23 and the latter accordingly is operated only by the restricted amount which is not by-passed. As a result the motor 23 will operate to rotate the drum 15 at a speed just sufficient to wind up the rope or cable 14 thereon in a manner to maintain the latter under enough tension to prevent any slack therein.

As the plane 17, by the action of the waves, is caused to fall, the weight of said plane will increase the tension on said line or cable 14 and thereby will cause a rotation of the drum 15 in an unwinding direction. The B-end 23, which normally constitutes a motor, is thereby caused to correspondingly operate in a reverse direction and to temporarily function as a pump. Under such conditions pressure fluid will pass from the pump 26 through the pipe 24 in one direction and from the B-end 23 through said pipe 24 in the opposite direction, and the combined volume of fluid flowing in opposite directions in said pipe 24 will flow through the pipe 62 into the annular space 54a of the distributing valve 54 and from there through the pipe 63 to the chamber 64. The pressure of the fluid in this chamber will move the low pressure valve 67 from its seat 66 and thereby permit the combined amounts of fluid to pass into the pipe 73. Under the conditions existing during the fall of the airplane on the water suction is created in opposite directions in the pipe 25 by the pump 26 and B-end 23 respectively, so that when said combined amounts of fluids reach said pipe 25 a portion of said fluid will pass to the B-end 23 and the balance will flow to the pump 26 to maintain the circulation. The drum 15 is therefore operated in an unwinding direction to pay out the rope or cable 14 at a speed to maintain the same under tension sufficient to prevent said rope or cable from becoming slack. Corresponding fluid distribution and circulation takes place as the boom 12 rises and falls with the rolling of the vessel 10 or as a result of composite movements due to the rise and fall of the plane 17 and of the boom 12.

In any case the distribution and circulation of the pressure fluid is predicated upon the movements of the plane 17 and boom 12 and the speed thereof, and is always such as to automatically maintain the rope or cable 14 under a merely nominal tension of approximately 500 pounds and to thereby prevent slackening and/or whipping thereof. In this connection it must be kept in mind that the hydraulic pump is set to develop a raising speed of 300 feet per minute which corresponds to the maximum lifting speed of a wave, and that the winch mechanism accordingly has an automatic range of adjustment within this limit which is capable of automatically meeting all conditions tending to produce slack or whip in the rope or cable 14.

In addition to the results set forth above the by-passing and distribution of the pressure fluid also serves to reduce the fluid pressure effective in the pipe 85 to a point where it is insufficient to force the plunger 86 downwardly against the restraining action of the springs 94; the plunger 86 accordingly cannot operate to disturb the predetermined adjustment or setting of the pump 26 prevailing at the time.

When it is desired to raise the plane 17 from the water for transfer to the vessel 10, the lever 58 is swung downwardly to correspondingly adjust the distributing valve 54 in Fig. 5 to a position in which the annular space 54a establishes communication between the pipes 62 and 74, the latter of which leads to the chamber 75 of the high pressure valve casing 76. As the spring 83 is sufficiently strong to resist a fluid pressure which is high enough to positively lift the plane 17 or its equivalent, the high pressure valve 79 will not be raised from its seat 77 at this stage; the pressure fluid accordingly will not be by-passed but will flow through the pipe 24 and after operating the motor 23 will return through the pipe 25 to the pump 26. It is to be kept in mind that the setting of the pump 26 is still such that its pumping capacity will develop a full speed raising, which as previously set forth is assumed to be 300 feet per minute, that is, the maximum lifting speed of a wave.

Under such conditions, as the plane 17 rises on a wave, the drum 15 will be operated in a winding direction to reel in the rope or cable 14 at a rate of speed corresponding to upward speed of said plane 17 as it is lifted by the action of the wave; during this period the pressure of the operating fluid is utilized entirely in the operation of the winch in the manner set forth so as to maintain the rope or cable under tension, and said pressure fluid has no appreciable effect upon the plunger 86, unless the plane rises at a rate less than 300 feet per minute. As soon however as the plane 17 is out of the water, its weight on the rope or cable 14 will develop a resistance to the continued winding of the drum 15 and said pressure fluid will become effective through the pipe 85 and cylinder 84, which at this moment constitute the path of least resistance, upon the plunger 86. The latter accordingly will be forced downwardly until further movement is arrested by the head 87 abutting the bottom of the cylinder 84; this downward movement of said plunger 86 is transmitted to the control member 39 and correspondingly moves the same downwardly against the resistance of the springs 47 and 94. The arrangement is such that this shifting of the control member 39 adjusts the pump 26 to a pumping capacity which will develop a lifting speed of approximately 100 feet per minute. The moment therefore that the plane 17 is free from the water the drum 15 will be rotated at a relatively slower speed to reel in the rope or cable 14 at a said speed of approximately 100 feet per minute. The plane 17 is accordingly lifted clear of the water during the period of a complete double roll of the vessel 10, so that as the boom 12 swings downwardly, the airplane will not strike the sea, unless the position of the end of the boom at the end of the complete double roll is considerably closer to the water than its position at the beginning. As soon as the plane has been lifted sufficiently high so that there is no possibility of the plane again striking the water, the hand wheel 53 may be rotated to bring the cross piece 43 down against the nuts 44. This movement does not operate the control member 39 since at the beginning of the movement the springs 47 were fully compressed by the action of the plunger 86. As soon as the airplane has been lifted high enough to clear the deck, the hand wheel 53 will be further operated to move the control member 39 downwardly away from plunger 86 into neutral position. At the proper time the boom 12 will be swung inboard on the vessel 10 and the winch will be operated, by further rotation of the handwheel 53 to move the tilting box into stroke in the opposite direction, to lower said plane 17 to the deck thereof; after this has been done the attaching device 16 is disconnected and the apparatus is ready for another operation. If at any time during the raising of the plane or its equivalent to the vessel, the tension on the rope or cable 14 is decreased, as for instance when an extra large wave or roll occurs and lifts the plane upwardly faster than the normal hoisting speed of 100 feet per minute, the pressure in cylinder 84 is reduced and plunger 86, together with control member 39, is permitted to move upwardly under the combined action of springs 47 and 94, thus increasing the hoisting speed to whatever value is necessary to maintain the cable at a tension somewhat higher than the constant tension maintained by the valve 67. It accordingly will be apparent that during the hoisting operation, movement of the plane will keep step with the movements of the rolling vessel and its overhanging boom. If the hoist is overloaded for any reason, such as by snagging of the cable during hoisting, the resulting increased pressure will cause the high pressure valve 79 to be lifted from its seat 77, permitting by-passing of the pressure fluid through the pipe 62, distributing valve 54, pipe 74, high pressure valve casing 76, pipes 87 and 73, and thus prevent damage to the hoist under conditions which would otherwise cause an overload.

The apparatus is comparatively simple in construction and provides for automatic raising and lowering of the plane or its equivalent at a predetermined rate, as for instance 300 feet per minute, and a positive raising speed at a predetermined rate, as for instance approximately 100 feet per minute.

Previous apparatus designed for the same purpose as the instant invention have depended upon the fluid pressure operating through the control moving the hydraulic pump or A-end, and include an awkward and complicated shift over. Furthermore, the arrangement of such prior apparatus requires the operator to shift over from automatic to manual control at exactly the moment he wants to start raising the plane or its equivalent; obviously it is difficult to pick this moment correctly with certainty and exactness.

With the instant application these objections are overcome by providing manual control for producing a raising rate of for instance 300 feet per minute until the plane or its equivalent is out of the water, and then utilizing a rise in pressure to automatically adjust the hydraulic pump in a manner to reduce this speed to for instance 100 feet per minute. The lever 58 may, therefore, be shifted over from constant tension to hoist at any time between the low point of the wave and its crest, or in other words in one half the total time of a complete double roll. The handwheel 53 may be rotated to catch up with the movement of the control member 39 caused by the plunger 86 at any time after the plane has been raised sufficiently high so that there is no possibility of the plane again touching the water.

Various changes in the specific forms shown and described may be made within the scope of the claims without departing from the spirit of the invention.

I claim:

1. In a device of the kind described including a rotatable drum, and a cable attached to an object floating in water subject to rise and fall through wave action and leading to said drum; that improvement which comprises pressure fluid actuated means for operating said drum, said means including a valve for relieving abnormal pressures and means responsive to a fluid pressure lower than that required to hoist the floating object from the water for by-passing said pressure fluid to automatically regulate and control the volume operatively effective upon said motor in predetermined accordance with the rise and fall of said floating object whereby said drum is operated to automatically maintain said cable against slack in harmony with the rising and falling movements of said object.

2. In a device of the kind described including a rotatable drum, and a cable attached to an object floating in water subject to rise and fall through wave action and leading to said drum; that improvement which comprises pressure fluid actuated means for operating said drum, said means including a valve for relieving abnormal pressures, means for adjusting said operating means to a predetermined hoisting speed for lifting said floating object from the water, a by-pass connected with said operating means, and a by-pass valve in said by-pass responsive to a fluid pressure lower than that required to hoist the floating object from the water for regulating and controlling the volume of pressure fluid operatively effective upon said pump during the rise and fall of the floating object induced by wave action to operate said drum in a manner to automatically maintain said cable against slack during the rise and fall of said object.

3. In a device of the kind described including a hoisting cable attached to an object floating in water subject to rise and fall through wave action and leading upwards and over an elevated support, a winch for hoisting said floating object; that improvement which comprises means for operating said winch, a by-pass valve controlling the flow of operating medium and whereby said winch is automatically caused to wind in said cable to prevent slack as the floating object rises, and to pay out cable when said object falls through wave action, a second by-pass valve controlling the flow of operating medium in a manner to cause said winch to hoist said floating object above the water, and means for selectively diverting the operating medium to one or the other of said by-pass valves.

4. In a vessel at sea subject to rolling due to wave action including an outboard boom on said vessel, a winch on said vessel, a cable connected with a floating object in the sea alongside of said vessel and leading to a predetermined point on said boom and to said winch, and pressure fluid operated means for operating said winch; said means including a valve for relieving abnormal pressures that improvement which comprises a by-pass communicating with said pressure fluid operated means, and a by-pass valve in said by-pass responsive to a fluid pressure lower than that required to hoist the floating object from the water for regulating and controlling the volume of pressure fluid effective to operate said winch whereby the latter is automatically caused to pay out cable when the outboard end of said boom swings upwardly, and to reel in cable to prevent slack in said cable when said boom swings downwardly.

5. In a vessel at sea subject to rolling due to wave action including an outboard boom on said vessel, a winch on said vessel, a cable connected with a floating object in the sea alongside said vessel and leading to a predetermined point on said boom and to said winch, and a hydraulic system including a pump and a fluid motor for operating said winch; that improvement which comprises a by-pass valve connected between the pump and motor controlling the flow of operating medium in a manner to automatically cause said winch to pay out cable when the outboard end of said boom swings upwardly, and to wind in said cable to prevent slack when said boom swings downwardly, a second by-pass valve connected between the pump and motor controlling the flow of operating medium in a manner to cause said winch to hoist said floating object above the water, and a manually operated distributing valve in said system for selectively diverting the operating medium to one or the other of said by-pass valves.

6. In a vessel at sea subject to rolling due to wave action including an outboard boom on said vessel, a winch on said vessel, a cable wound on the drum of said winch and leading to a predetermined point on said boom and attached to a floating object in the sea alongside of said vessel and of relatively small size compared thereto, and pressure fluid operated means for operating said winch; said means including a valve for relieving abnormal pressures that improvement which comprises means operating in dependence upon the release and development of pulling forces on said cable of a magnitude less than those developed in lifting the floating object from the water for by-passing the pressure fluid to regulate and control the volume thereof effective to operate said winch in a manner to maintain said cable under a substantially constant tension which is a fraction of the weight of the floating object.

7. In a mooring and hoisting apparatus, a rotatable drum, a cable wound on said drum, a fluid pressure operated motor connected with said drum for operating the same, a variable output pump, two pipes connecting said pump with said motor, a control member for adjusting said pump to vary its output, a cross-bar carried by said control member, a plurality of rods projecting from said cross-bar, a member mounted on said rods in slidable relation thereto and provided with an internally threaded boss, springs on said rods whereby said cross-bar and member are yieldingly connected with each other, a manually operable adjusting screw in threaded connection with said boss for manually adjusting said control member, a fixed cylinder, a pressure connection from said pump to said cylinder, a spring controlled plunger slidable in said cylinder and having a restricted outward movement relatively thereto for automatically operating said control member, a distributing valve casing, a by-pass connection leading from one of said pipes to said casing, a low pressure by-pass valve connected with said casing, a high pressure by-pass valve connected with said casing, connections leading from said by-pass valves to the other of said pipes, and a manually operated distributing valve in said casing for selectively diverting the operating fluid from said by-pass connection to either of said by-pass valves at will, whereby said drum is automatically operated to maintain a substantially constant relatively low tension on said cable or to develop a predetermined lifting force therein.

8. In a mooring and hoisting apparatus, a rotatable drum, a cable wound on said drum, a fluid pressure operated motor connected with said drum for operating the same, a variable output pump, two pipes connecting said pump with said motor, a control member for adjusting said pump to vary its output, a spring actuated control mechanism having springs strong enough to adjust said control member, means for manually operating said control mechanism, a fixed cylinder, a pressure connection from said pump to said cylinder, a spring controlled plunger slidable in said cylinder and having a restricted outward movement relatively thereto for automatically operating said control member, a distributing valve casing, a by-pass connection leading from one of said pipes to said casing, a low pressure by-pass valve connected with said casing, a high pressure by-pass valve connected with said casing, connections leading from said by-pass valves to the other of said pipes, and a manually operable distributing valve in said casing for selectively diverting the operating fluid to either of said by-pass valves at will whereby said drum is automatically operated to maintain a substantially constant relatively low tension on said cable or to develop a predetermined lifting force therein.

9. In a mooring and hoisting apparatus, a rotatable drum, a cable wound on said drum, a fluid pressure operated motor connected with said drum for operating the same, a variable output pump, pipes connecting said pump with said motor, a control member for adjusting said pump to vary its output, a spring actuated control mechanism operatively associated with said control member and having springs strong enough to adjust said control member, means for manually operating said control mechanism, means communicating with said pipes for by-passing the operating fluid relatively to said hydraulic motor, by-pass valves of different pressures in said by-passing means, manually controlled means for selectively diverting said operating fluid to any one of said by-pass valves, whereby said drum is automatically operated to maintain a substantially constant tension on said cable or to develop a predetermined lifting force therein, and pressure operated means connected with said pump and operated when said operating fluid is diverted to the by-pass valve of higher pressure whereby said control member is automatically actuated to reduce the pump output and thereby create a predetermined reduced lifting speed in said cable.

10. In a mooring and hoisting apparatus, a rotatable drum, a cable wound on said drum, a fluid pressure operated motor connected with said drum for operating the same, a variable output pump, pipes connecting said pump with said motor, a control member for adjusting said pump to vary its output, a spring actuated control mechanism having springs strong enough to adjust said control member, means for manually operating said control mechanism, pressure operated means connected with said pump for automatically operating said control member, means communicating with said pipes for by-passing the operating fluid relatively to said hydraulic motor, a plurality of by-pass valves in said by-passing means, and means for selectively diverting said operating fluid to any of said by-pass valves whereby said drum is automatically controlled to maintain a substantially constant tension on said cable or to develop a predetermined lifting action therein, and to coincidentally operate said pressure operated means and said control member to create a predetermined lifting speed in said cable.

11. In a mooring and hoisting apparatus, a rotatable drum, a cable wound on said drum, adjustable fluid pressure operated means connected with said drum for operating the same, manually operable means for varying the adjustment of said fluid pressure operated means, automatic means for automatically varying said adjustment independently of said manually operable means, and means for by-passing and controlling the flow of operating fluid to automatically control said drum for developing a substantially constant tension on said cable, or a predetermined lifting speed therein, and to coincidentally operate said automatic means to create a predetermined lifting speed in said cable.

12. In a mooring and hoisting apparatus, a rotatable drum, a cable connected with said drum, a system including a hydraulic motor operatively connected with said drum, a hydraulic pump, connections between said pump and motor for delivering operating fluid to the latter to operate said drum, means for preventing excessive pressures in said system and means communicating with the connections at points between said pump and motor whereby the volume of operating fluid operatively effective upon said hydraulic motor is automatically regulated and controlled to operate said drum at speeds corresponding to the lifting and descending speeds of sea waves whereby said cable is maintained under a tension less than that required to hoist the object from the water but sufficient to prevent slack therein.

13. In a mooring and hoisting apparatus, a rotatable drum, a cable connected with said drum, a system including a hydraulic motor operatively connected with said drum, a hydraulic pump, pressure and return pipes connecting said pump with said motor whereby operating fluid is circulated to operate said motor and drum, means for preventing excessive pressure in said system and means communicating with said pressure and return pipes at points between the motor and pump whereby the volume of operating fluid to said motor is automatically regulated and controlled to operate said drum at a winding-up speed corresponding to the lifting speed of a wave and at an unwinding speed corresponding to the descending speed of a wave to thereby maintain said cable under a tension during said wave action less than that required to hoist the object from the water but sufficient to prevent slack therein.

14. In a vessel at sea subject to rolling due to wave action including an outboard boom, a rotatable drum on said vessel and a cable adapted to be wound upon and unwound from said drum leading to a predetermined point of said boom and attached to a floating object in the sea alongside said vessel; that improvement which comprises a hydraulic motor operatively connected with said drum, an adjustable hydraulic pump, pipes connecting said pump with said motor whereby operating fluid is circulated, adjustable means connected with said pump for varying the adjustment thereof, means for preventing excessive pressures in said pipes by-passing means connected with said pipes, and a pressure valve in said by-passing means adapted to resist by-passing of said operating fluid whereby said drum is operated at a winding-up speed corresponding to the lifting speed of a wave during hoisting of said floating object to thereby prevent slack in said cable, means for directing operating fluid to said adjustable means to automatically operate the latter in a manner to reduce the winding-up rotation of said drum to a predetermined hoisting speed, said pressure valve, under increased pressure, being arranged to by-pass the operating fluid in a manner to regulate the hoisting operation in step with the movements of the rolling vessel.

15. In a mooring and hoisting apparatus of the kind described, the combination of a rotatable drum, a cable connected with said drum, a hydraulic motor operatively connected with said drum, an adjustable hydraulic pump having a constant delivery capacity at a given setting connected with said motor, means for preventing the development of excessive pressures by said pump and valve-controlled by-pass means whereby the pressure of the operating fluid effective to operate said motor is automatically regulated to a value less than that required to hoist the floating object from the water, without variation in the existing delivery capacity of the pump, to actuate said drum in a manner to maintain said cable against slack during rising and falling movements induced by wave action.

16. In a mooring and hoisting apparatus of the kind described, the combination of a rotatable drum, a cable connected with said drum, a hydraulic motor operatively connected with said drum, an adjustable hydraulic pump having a constant delivery capacity at a given setting connected with said motor, a by-pass communicating with the connections between said pump and motor, a by-pass valve in said by-pass loaded to resist by-passing of the operating fluid up to a predetermined pressure whereby the full fluid delivery capacity of the pump will be operatively effective upon said motor during the rising movement of a floating object induced by wave action during a given hoisting operation, and means for adjusting the pump to vary its output connected with said pump, said adjusting means being automatically operated to reduce the delivery output of said pump when said floating object is clear of the water whereby said drum is actuated at a predetermined lifting speed to complete the hoisting operation, the loaded by-pass valve being arranged to by-pass operating fluid when excessive strains are developed on said cable during the lifting of the floating object whereby the operation of the drum during said hoisting operation will be automatically maintained in step with movements induced by said wave action.

17. In a mooring and hoisting apparatus, a rotatable drum, a cable connected with said drum, hydraulic motor operatively connected with said drum, a hydraulic pump, connections between said pump and motor for delivering operating fluid to the latter to operate said drum, and means communicating with the connections at points between said pump and motor whereby the volume of operating fluid operatively effective upon said hydraulic motor is automatically regulated and controlled to operate said drum at speeds corresponding to the lifting and descending speeds of sea waves whereby said cable is maintained under a tension sufficient to prevent slack therein, manually shiftable means for rendering the motor operative to wind in cable under full load, and means automatically responsive to the loading and unloading of the cable for maintaining the cable tension above a predetermined minimum during hoisting of the object from the water.

18. In a mooring and hoisting apparatus, a rotatable drum, a cable connected with said drum, a hydraulic motor operatively connected with said drum, a hydraulic pump, pressure and return pipes connecting said pump with said motor whereby operating fluid is circulated to operate said motor and drum, control means for automatically controlling and regulating the volume of operating fluid to said motor to operate said drum at a winding-up speed corresponding to the lifting speed of a wave and at an unwinding speed corresponding to the descending speed of a wave to thereby maintain said cable under a tension during said wave action sufficient to prevent slack therein, and manually shiftable means for rendering said control means effective to cause operation of the drum in a winding-up direction only, and means responsive to a load on the cable for controlling said motor at a predetermined minimum speed when the full load is on the cable and at a higher speed corresponding to the lifting speed of a wave whenever the load is relieved by wave action.

19. In a mooring and hoisting apparatus, a rotatable drum, a cable connected with said drum, a hydraulic motor operatively connected with said drum, a hydraulic pump, pressure and return pipes connecting said pump with said motor whereby operating fluid is circulated to operate said motor and drum, control means for automatically controlling and regulating the volume of operating fluid to said motor to operate said drum at a winding-up speed corresponding to the lifting speed of a wave and at an unwinding speed corresponding to the descending speed of a wave to thereby maintain said cable under a tension during said wave action sufficient to prevent slack therein, and manually shiftable means hydraulically connected to said control means for rendering said control means effective to prevent operation of said drum except at a speed above a predetermined minimum in the winding-up direction.

20. In a mooring and hoisting apparatus, a rotatable drum, a cable connected with said drum, a hydraulic motor operatively connected with said drum, a hydraulic pump, connections between said pump and motor for delivering operating fluid to the latter to operate said drum, means whereby the volume of operating fluid operatively effective upon said hydraulic motor is automatically regulated and controlled to operate said drum at speeds corresponding to the lifting and descending speeds of sea waves whereby said cable is maintained under a tension sufficient to prevent slack therein, and manually shiftable means hydraulically connected to said first means for preventing rotation of said drum in a descending direction .

21. In a mooring and hoisting apparatus of the kind described, the combination of a rotatable drum, a cable connected with said drum, a hydraulic motor unit operatively connected with said drum, a hydraulic pump unit connected with said motor, one of said units being provided with means for varying the displacement thereof, a by-pass communicating with the connections between said pump and motor, a by-pass valve in said by-pass loaded to resist by-passing of the operating fluid up to a predetermined pressure whereby the full fluid delivery capacity of the pump will be operatively effective upon said motor during the rising movement of a floating object induced by wave action during a given hoisting operation, and means connected with said pump for adjusting the position of the displacement varying means, said adjusting means being automatically operated to reduce the speed ratio of power transmission between the pump and motor when said floating object is clear of the water whereby said drum is actuated at a predetermined lifting speed to complete the hoisting operation, the loaded by-pass valve being arranged to by-pass operating fluid when excessive strains are developed on said cable during the lifting of the floating object whereby the operation of the drum during said hoisting operation will be automatically maintained in step with movements induced by said wave action.

22. In a mooring and hoisting apparatus of the kind described, the combination of a rotatable drum, a cable connected with said drum, a hydraulic motor unit operatively connected with said drum, a hydraulic pump unit connected with said motor, one of said units being provided with means for varying the displacement thereof, means for limiting the torque which may be applied by the motor to the drum whereby the drum may exert a substantially constant tension on a floating object to cause the cable to follow the wave induced movements of the object, a manually operable control means for rendering said second means ineffective whereby the object may be hoisted away from the water, and means responsive to the loading of the cable when the weight of the object is imposed thereon for operating the displacement varying means to reduce the hoisting speed below the maximum available when the torque limiting means is effective.

23. In a mooring and hoisting apparatus of the kind described, the combination of a rotatable drum, a cable connected with said drum, a hydraulic motor unit operatively connected with said drum, a hydraulic pump unit connected with said motor, one of said units being provided with means for varying the displacement thereof, means for limiting the torque which may be applied by the motor to the drum whereby the drum may exert a substantially constant tension on a floating object to cause the cable to follow the wave induced movements of the object, a manually operable control means for rendering said second means ineffective whereby the object may be hoisted away from the water, and pressure responsive means responsive to the loading of the cable when the weight of the object is imposed thereon for operating the displacement varying means to reduce the hoisting speed below the maximum available when the torque limiting means is effective.

24. In a mooring and hoisting apparatus of the kind described, the combination of a rotatable drum, a cable connected with said drum, a hydraulic motor unit operatively connected with said drum, a hydraulic pump unit connected with said motor, one of said units being provided with means for varying the displacement thereof, pressure responsive means for limiting the torque which may be applied by the motor to the drum whereby the drum may exert a substantially constant tension on a floating object to cause the cable to follow the wave induced movements of the object, a manually operable control means for rendering said second means ineffective whereby the object may be hoisted away from the water, and means responsive to the loading of the cable when the weight of the object is imposed thereon for operating the displacement varying means to reduce the hoisting speed below the maximum available when the torque limiting means is effective.

25. In a mooring and hoisting apparatus of the kind described, the combination of a rotatable drum, a cable connected with said drum, a hydraulic motor unit operatively connected with said drum, a hydraulic pump unit connected with said motor, one of said units being provided with means for varying the displacement thereof, pressure responsive means for limiting the torque which may be applied by the motor to the drum whereby the drum may exert a substantially constant tension on a floating object to cause the cable to follow the wave induced movements of the object, a manually operable control means for rendering said second means ineffective whereby the object may be hoisted away from the water, and pressure responsive means responsive to the loading of the cable when the weight of the object is imposed thereon for operating the displacement varying means to reduce the hoisting speed below the maximum available when the torque limiting means is effective.

WARREN E. ROUSE.